United States Patent [19]

Bruchmann et al.

[11] Patent Number: 5,744,569
[45] Date of Patent: Apr. 28, 1998

[54] ONE-COMPONENT AND TWO-COMPONENT POLYURETHANE COATING COMPOSITIONS

[75] Inventors: Bernd Bruchmann, Ludwigshafen; Hans Renz, Meckenheim; Günter Mohrhardt, Speyer, all of Germany

[73] Assignee: BASF Aktiengesellschaft, Ludwigshafen, Germany

[21] Appl. No.: 672,332

[22] Filed: Jun. 28, 1996

[51] Int. Cl.⁶ .................................................. C08G 18/46
[52] U.S. Cl. .......................... 528/73; 528/69; 428/423.1; 427/385.5; 549/22; 549/39; 549/373; 549/451; 549/452
[58] Field of Search .................. 528/73, 69; 428/423.1; 427/385.5; 549/22, 39, 323, 451, 452

[56] References Cited

U.S. PATENT DOCUMENTS

| | | | |
|---|---|---|---|
| 3,849,445 | 11/1974 | Papa et al. | 549/448 |
| 4,002,601 | 1/1977 | Hajik et al. | 528/59 |
| 4,204,051 | 5/1980 | Wellner et al. | 528/55 |
| 4,349,655 | 9/1982 | Lestner et al. | 528/45 |
| 5,126,170 | 6/1992 | Zwiener et al. | 528/68 |

FOREIGN PATENT DOCUMENTS

| | | |
|---|---|---|
| 0 028 401 | 5/1981 | European Pat. Off. . |
| 0 403 921 | 12/1990 | European Pat. Off. . |
| 52 968 | 8/1945 | France . |
| 2 286 134 | 4/1976 | France . |
| 1 463 944 | 2/1977 | United Kingdom . |

*Primary Examiner*—Rachel Gorr
*Attorney, Agent, or Firm*—Oblon, Spivak, McClelland, Maier & Neustadt, P.C.

[57] ABSTRACT

In one-component and two-component polyurethane coating compositions comprising at least one reactive component capable of reacting with polyisocyanates, the reactive component is a compound A) containing an isocyanate group, a urethane, thiourethane or urea group and two capped isocyanate-reactive groups.

10 Claims, No Drawings

ONE-COMPONENT AND TWO-COMPONENT POLYURETHANE COATING COMPOSITIONS

The invention relates to one-component and two-component polyurethane coating compositions comprising at least one reactive component capable of reacting with polyisocyanates, wherein the reactive component is a compound A) containing an isocyanate group, a urethane, thiourethane or urea group and containing two capped isocyanate-reactive groups.

Polyurethane coating compositions generally contain a polyisocyanate and a component capable of reacting with isocyanate, eg. a polyol. To set the necessary processing viscosity, the coating compositions usually contain an organic solvent. However, the minimum possible solvent required is desired. To achieve this, the coating compositions should have as low as possible a viscosity even without a solvent or with small amounts of solvent, ie. at high solids contents. This effect can be achieved, for example, by adding reactive diluents which lower the viscosity and are subsequently consumed by reaction in the system.

EP-A-403 921 discloses, for example, polyaspartic acid derivatives as reactive diluents. These compounds contain secondary amino groups which react with the isocyanate groups of the polyisocyanates to form urea groups. A particular disadvantage of the reactive diluents known hitherto is that the content of polyisocyanate in the coating composition has to be greatly increased to achieve the necessary complete reaction with the reactive diluents. The costs of the coating composition depend essentially on the polyisocyanate as the valuable component.

GB 14 63 944 discloses addition products of oxazolidine derivatives and diisocyanates as such.

It is an object of the present invention to provide polyurethane coating compositions which have a low viscosity at high solids contents. It is also an object of the invention to provide reactive components or reactive diluents for two-component polyurethane coating compositions.

We have found that the first of these objects is achieved by means of the polyurethane coating compositions defined in the introduction. Likewise, suitable reactive components or reactive diluents for one-component and two-component polyurethane coating compositions have been found.

The further details below relate to preferred embodiments of the invention.

The compound A) is preferably a low molecular weight compound having a molecular weight below 2000 g/mol, in particular below 1000 g/mol and particularly preferably below 500 g/mol.

A preferred compound A) is the addition product of 1 mol of diisocyanate and 1 mol of a compound having the general structural formula

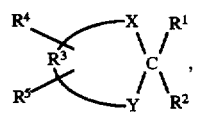  I where $R^1$ and $R^2$ are, independently of one another, hydrogen or $C_1$–$C_{10}$-alkyl. X and Y are, independently of one another, oxygen, sulfur or an N-$R^6$ group. $R^3$ is $C_1$–$C_5$-alkylene and the heterocyclic ring formed by X, Y and $R^3$ can be substituted by further radicals $R^4$ and $R^5$, where one of the radicals $R^4$, $R^5$ and $R^6$ must be a group capable of reacting with isocyanate or contain a group capable of reacting with isocyanate, eg. mercapto, hydroxyl, primary or secondary amino, and the other radicals $R^4$, $R^5$ and $R^6$ must contain no group capable of reacting with isocyanate.

Preferably, $R^1$ and $R^2$ are hydrogen or $C_1$–$C_4$-alkyl.

$R^4$, $R^5$ and $R^6$, if they contain no group capable of reacting with isocyanate, are preferably each an aromatic, in particular aliphatic group having up to 20 carbon atoms; they are particularly preferably $C_1$–$C_8$-alkyl.

The group $R^4$, $R^5$, $R^6$ containing the group capable of reacting with isocyanate, ie. for example, hydroxyl, mercapto, primary or secondary amino, is preferably an aromatic group having from 5 to 10 carbon atoms or an aliphatic group having from 1 to 20 carbon atoms, which may be interrupted by ether groups, and is substituted by a hydroxyl group, mercapto group or a primary amino group, or contains a secondary amino group. Suitable compounds I are those which contain no further radicals $R^4$, $R^5$ or $R^6$ apart from the radical containing the group which is reactive towards isocyanate. It is essential that the compound of the formula I contains only one free, ie. not blocked and thus reactive towards isocyanate, group.

The compound A), as addition product of a diisocyanate with the compound I, then contains exactly one urethane group (reaction of a hydroxyl group with isocyanate), one thiourethane group (reaction of a mercapto group with an isocyanate) or a urea group (reaction of a primary or secondary amino group with isocyanate), exactly one isocyanate group and exactly two blocked isocyanate-reactive groups.

The diisocyanates preferably consist, apart from the isocyanate groups, exclusively of carbon and hydrogen.

Mention may be made of straight-chain or branched $C_4$–$C_{14}$-alkylene diisocyanates, eg. tetramethylene diisocyanate, hexamethylene diisocyanate(1,6-diisocyanatohexane), octamethylene diisocyanate, decamethylene diisocyanate, dodecamethylene diisocyanate, tetradecamethylene diisocyanate, trimethylhexane diisocyanate or tetramethylhexane diisocyanate, cycloaliphatic diisocyanates such as 1,4-, 1,3- or 1,2-diisocyanatocyclohexane, 4,4'-di(isocyanatocyclohexyl)methane, 1-isocyanato-3,3,5-trimethyl-5-(isocyanatomethyl)cyclohexane (isophorone diisocyanate) or 2,4- or 2,6-diisocyanato-1-methylcyclohexane, aromatic diisocyanates such as 2,4-diisocyanatotoluene, 2,6-diisocyanatotoluene, 1,4-diisocyanatobenzene, 4,4'- and 2,4'-diisocyanatodiphenylmethane, p-xylylene diisocyanate, and also 1,5-naphthylene diisocyanate or the substituted aromatic isocyanates such as tetramethylxylene diisocyanate and isopropenyldimethyltolylene diisocyanate.

Preferred compounds A) are, for example, the addition products of the above diisocyanates, in particular hexamethylene diisocyanate, isophorone diisocyanate, 4,4'-di(isocyanatocyclohexyl)methane, tetramethylxylylene diisocyanate, 2,4-tolylene diisocyanate, 2,6-tolylene diisocyanate, diphenylmethane 4,4'- diisocyanate or mixtures of said isocyanates, with dioxolanes of the formula

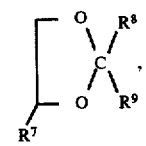  II dioxanes of the formula

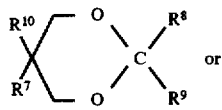   III oxazolidine derivatives of the formula

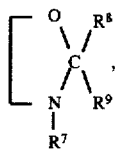   IV where $R^8$, $R^9$ and $R^{10}$ are, independently of one another, hydrogen or $C_1$–$C_{10}$-alkyl, preferably $C_1$–$C_4$-alkyl, $R^8$ and $R^9$ are particularly preferably hydrogen or methyl and $R^{10}$ is particularly preferably ethyl, and $R^7$ is an aliphatic or aromatic radical having from 1 to 30 carbon atoms, preferably an aromatic group having from 5 to 10 carbon atoms, and an aliphatic group having from 1 to 20 carbon atoms which may be interrupted by ether groups, and $R^7$ must be substituted by a hydroxyl group, a mercapto group or a primary amino group or must contain a secondary amino group.

$R^7$ is particularly preferably a branched or linear $C_1$–$C_8$-hydrocarbon chain which is substituted by a hydroxyl group or a primary amino group.

The two-component polyurethane coating composition of the present invention can contain compounds A) as sole reactive component capable of reacting with isocyanate, since the compound A) contains, in addition to an isocyanate group, two blocked isocyanate-reactive (groups X and Y in formula I).

The blocking agents are, on subsequent use, liberated from the compound A) by the action of atmospheric moisture, so that the previously blocked groups are then present in the reactive form, as hydroxyl, mercapto or primary or secondary amino groups.

The polyurethane coating composition of the present invention can contain, in addition to compounds A), further reactive components capable of reacting with isocyanate (hereinafter simply referred to as reactive components).

The proportion of the compounds A) is preferably from 1 to 100% by weight, based on the reactive components.

The viscosity depression in the coating composition achievable by means of the compounds A) is particularly high at a content of from 5 to 100% by weight, particularly preferably from 20 to 100% by weight and very particularly preferably from 50 to 100% by weight of the compounds A), based on the total amount of the reactive components.

Further reactive components which may be mentioned are, for example, hydroxy-functional polymers (free-radically polymerized), polycondensates or polyadducts.

The hydroxy-functional polymers are, for example, polymers having a hydroxyl content of from 0.1 to 20, preferably from 0.5 to 10, % by weight. The number average molecular weight $M_n$ of the polymers is preferably from 1000 to 100 000, particularly preferably from 2000 to 10 000. The polymers are preferably ones comprising more than 50% by weight of $C_1$–$C_{20}$-alkyl (meth)acrylate, vinylaromatics having up to 20 carbon atoms, vinyl esters of carboxylic acids containing up to 20 carbon atoms, vinyl halides, nonaromatic hydrocarbons having from 4 to 8 carbon atoms and 1 or 2 double bonds, unsaturated nitriles and mixtures thereof. Particular preference is given to the polymers comprising more than 60% by weight of $C_1$–$C_{10}$-alkyl (meth)acrylates, styrene or mixtures thereof.

In addition, the polymers contain hydroxy-functional monomers corresponding to the above hydroxyl content and, if desired, further monomers, eg. ethylenically unsaturated acids, in particular carboxylic acids, acid anhydrides or acid amides.

Further reactive components are, for example, polyesterols as are obtainable by condensation of polycarboxylic acids, in particular dicarboxylic acids, with polyols, in particular diols.

Further suitable reactive components are polyetherols which are prepared from H-active components by addition of ethylene oxide, propylene oxide or butylene oxide. Polycondensates made from butanediol are likewise suitable.

Naturally, the reactive components can also be compounds containing primary or secondary amino groups.

Examples which may be mentioned are Jeffamines, ie. polyetherols terminated by amino groups, or oxazolidines.

In the case of one-component polyurethane coating compositions, one of the reactants (isocyanate or compound which reacts with isocyanate) is present completely in blocked, ie. unreacted, form.

The one-component polyurethane coating compositions of the present invention therefore comprise only reactive components having blocked isocyanate-reactive groups. Apart from the compounds A, it is also possible to use other reactive components having blocked isocyanate-reactive groups, eg. aldimines, ketimines, oxazolidines.

In general, the one-components polyurethane coating compositions of the present invention contain from 50 to 100% by weight, preferably from 70 to 100% by weight and particularly preferably 100% by weight, of compounds A) as reactive component having blocked isocyanate-reactive groups.

Mixing of the polyisocyanates with the reactive components shortly before processing is omitted.

The one-component polyurethane coating compositions comprise polyisocyanates and the reactive component having blocked isocyanate-reactive groups and are stable on storage.

Two-component polyurethane coating compositions additionally contain at least one of the abovementioned reactive components having free isocyanate-reactive groups. These reactive components are generally mixed with the other polyisocyanates and compounds A) shortly before processing (hence 2-component).

As already indicated above, the polyurethane coating compositions of the present invention contain, in addition to the reactive components, at least one component capable of reacting with these reactive components, in particular polyisocyanates.

Polyisocyanates which may be mentioned are, for example, customary diisocyanates and/or customary higher-functional polyisocyanates having a mean NCO-functionality of from 2.0 to 4.5. These components can be present individually or in admixture.

Examples of customary diisocyanates are aliphatic diisocyanates such as tetramethylene diisocyanate, hexamethylene diisocyanate (1,6-diisocyanatohexane), octamethylene diisocyanate, decamethylene diisocyanate, dodecamethylene diisocyanate, tetradecamethylene diisocyanate, tetramethylxylylene diisocyanate, trimethylhexane diisocyanate or tetramethylhexane diisocyanate, cycloaliphatic diisocyanates such as 1,4-, 1,3- or 1,2-diisocyanatocyclohexane, 4,4'-di(isocyanatocyclohexyl)methane, 1-isocyanato-3,3,5-trimethyl-5-(isocyanatomethyl)cyclohexane(isophorone diisocyanate) or 2,4- or 2,6-diisocyanato-1- methylcyclohexane and also aromatic diisocyanates such as tolylene 2,4- or 2,6-diisocyanate, p-xylylene diisocyanate, 2,4'- or 4,4'-diisocyanatodiphenylmethane, phenylene 1,3- or 1,4-diisocyanate, 1-chlorophenylene 2,4-diisocyanate, naphthylene 1,5-diisocyanate, tetramethylxylylene diisocyanate, biphenylene 4,4'-diisocyanate, 4,4'-diisocyanato-3,3'-dimethylbiphenyl, 3-methyldiphenylmethane 4,4'-diisocyanate or diphenyl ether 4,4'-diisocyanate. Mixtures of said diisocyanates can also be present. Preference is given to hexamethylene diisocyanate and isophorone diisocyanate, and also tolylene 2,4- and 2,6-diisocyanate and diphenylmethane 2,4'- and 4,4'-diisocyanate.

Suitable customary higher-functional polyisocyanates are, for example, triisocyanates such as 2,4,6-triisocyanatotoluene or 2,4,4'-triisocyanato(diphenyl ether) or the mixtures of diisocyanates, triisocyanates and higher polyisocyanates which are obtained by phosgenation of corresponding aniline/formaldehyde condensates and are polyphenyl polyisocyanates containing methylene bridges.

Of particular interest are the customary aliphatic higher-functional polyisocyanates of the following groups:

(a) polyisocyanates containing isocyanurate groups and derived from aliphatic and/or cycloaliphatic diisocyanates. Particular preference is here given to the corresponding isocyanato-isocyanurates based on hexamethylene diisocyanate and isophorone diisocyanate. The present isocyanurates are, in particular, simple tris-isocyanatoalkyl or tris-isocyanatocycloalkyl isocyanurates which represent cyclic trimers of the diisocyanates, or mixtures with their higher homologues containing more than one isocyanurate ring. The isocyanato-isocyanurates generally have an NCO content of from 10 to 30% by weight, in particular from 15 to 25% by weight, and a mean NCO functionality of from 2.6 to 4.5.

(b) Diisocyanates containing uretdione groups and aromatically, aliphatically and/or cycloaliphatically bonded isocyanate groups, preferably derived from hexamethylene diisocyanate or isophorone diisocyanate. Uretdione diisocyanates are cyclic dimerization products of diisocyanates.

(c) Polyisocyanates containing biuret groups and aliphatically bonded isocyanate groups, in particular tris(6-isocyanatohexyl)biuret or its mixtures with its higher homologues. These polyisocyanates containing biuret groups generally have an NCO content of from 10 to 30% by weight, in particular from 18 to 25% by weight, and a mean NCO-functionality of from 3 to 4.5.

(d) Polyisocyanates containing urethane and/or allophanate groups and aliphatically or cycloaliphatically bonded isocyanate groups, as can be obtained, for example, by reacting excess amounts of hexamethylene diisocyanate or isophorone diisocyanate with polyhydric alcohols such as trimethylolpropane, glycerol, 1,2-dihydroxypropane or mixtures thereof. These polyisocyanates containing urethane and/or allophanate groups generally have an NCO content of from 12 to 20% by weight and a mean NCO-functionality of from 2.5 to 3.

(e) Polyisocyanates containing oxadiazinetrione groups, preferably derived from hexamethylene diisocyanate or isophorone diisocyanate. Such polyisocyanates containing oxadiazinetrione groups can be prepared from diisocyanate and carbon dioxide.

(f) Carbodiimide-modified or uretonimine-modified polyisocyanates.

The isocyanate groups of the above polyisocyanates a)–f) can also be partly reacted with monoalcohols.

Aliphatic and cycloaliphatic polyisocyanates are particularly preferred. Very particular preference is given to hexamethylene diisocyanate and isophorone diisocyanate and, in particular, their isocyanurates and biurets.

The coating compositions of the present invention generally contain the polyisocyanates and the reactive component (ie. compound A) and, if desired, further compounds capable of reacting with isocyanate) in such amounts that from 0.8 to 1.2 mol of isocyanate-reactive groups, both free and blocked groups, are present per 1 mol of total isocyanate groups present. The molar ratio is particularly preferably about 1:1.

However, the polyisocyanates, both in the one-component and two-component systems, can be completely or partially replaced by other compounds capable of reacting with the reactive component(s). Suitable other reactive compounds are, for example, polyepoxides, compounds containing acid anhydride groups or compounds containing N-methylol groups or etherified N-methylol groups, eg. urea or melamine resins, which can react with the groups X and Y of compound A).

The coating compositions of the present invention can further contain organic solvents, eg. xylene, butyl acetate, methyl isobutyl ketone, methoxypropyl acetate, N-methylpyrrolidone. Solvents are used to set the low viscosity of the coating composition desired for processing, ie. for application to a substrate. The compound A) has the effect of significantly less solvent being required for this purpose, ie. the low viscosity desired is achieved at higher solids contents.

Naturally, the coating compositions can contain further additives customary in coating technology, eg. pigments, fillers, leveling agents, etc.

They can further contain catalysts for urethane formation, eg. dibutyltin dilaurate.

In order to prepare the coating compositions of the present invention, the individual constituents can be mixed with one another in a known manner. The compounds A) and, if desired, further reactive components having blocked isocyanate-reactive groups can be mixed with the polyisocyanates long before processing (1-component system). Reactive components having free isocyanate-reactive groups are generally added to the isocyanate only shortly before processing (2-component systems). The desired viscosity can be set by means of solvents. The coating composition can be applied to substrates in a customary manner by spraying, pouring, rolling, painting, doctor blade coating, etc. The coating composition is particularly suitable for substrates such as metallic bases, wood or wood materials, plastics, etc.

The blocked isocyanate-reactive groups of the compound A) are liberated under the action of atmospheric moisture. The reaction of the compounds A) with the polyisocyanates then proceeds at room temperature in a known manner.

The coatings obtained have very good mechanical properties, in particular high hardness, flexibility and chemical resistance.

EXAMPLES

The hydroxy-functional starting compounds (structural formulae (1) to (5)) for the compounds A) are listed in Table 1 and are prepared as described in the preparative methods (PM) indicated or are purchased from the company indicated.

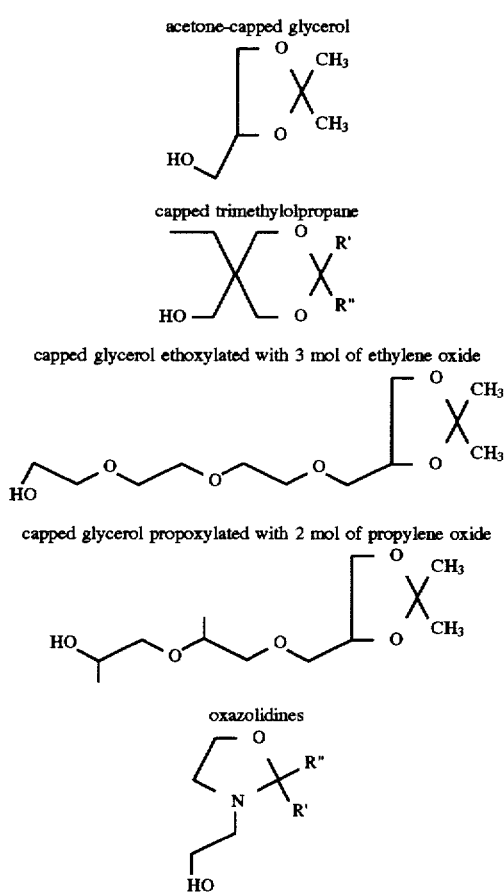

TABLE 1

| | Hydroxy-functional starting compounds | | |
|---|---|---|---|
| No. | R' | R" | Preparation |
| (1) | — | — | Fluka AG |
| (2a) | H | H | Perstorp Polyols |
| (2b) | CH$_3$ | CH$_3$ | PM1 |
| (2c) | CH$_3$ | C$_2$H$_5$ | PM1 |
| (2d) | CH$_3$ | i-C$_4$H$_9$ | PM1 |
| (3) | — | — | PM2 |
| (4) | — | — | PM2 |
| (5a) | H | H | U.S. Pat. No. 3,037,006 |
| (5b) | H | i-C$_3$H$_7$ | DE-A 22 45 636 |

PM 1

Preparation of the capped trimethylolpropane derivatives 250 g of trimethylolpropane are refluxed together with 750 ml of petroleum ether (boiling range 30°–75° C.), 750 ml of the corresponding ketone and 0.15 g of p-toluenesulfonic acid monohydrate for 24 hours. The water of reaction formed is then removed via a water separator. The solution is cooled, 0.5 g of sodium methoxide is added and the mixture is stirred for 1 hour at room temperature. The solution is filtered, the solvent is removed on a rotary evaporator and the residue is distilled under reduced pressure.

2b: Yield 78% of theory, boiling point 71°–72° C. (0.5 mbar)

2c: Yield 84% of theory, boiling point 89° C. (0.3 mbar)
2d: Yield 83% of theory, boiling point 96° C. (0.3 mbar)

PM 2

Preparation of the alkoxylated isopropylideneglycerol derivatives 5 l reactor suitable for preparing polyetherols is charged with 1060 g (8 mol) of isopropylidene glycerol (1), 4 g of potassium tert-butoxide are added and the mixture is heated to 110° C. At this temperature, 24 mol of ethylene oxide or 16 mol of propylene oxide are added. The reaction is continued until the pressure is constant. Subsequently, vacuum is applied for 30 minutes. After the monomer removal, the reactor is ventilated with nitrogen, cooled to 50° C. and the product is drained. The work-up for removing the alkali is carried out by adding 3% by weight of a magnesium silicate (Ambusol, cation exchanger) and heating for 2 hours at 100° C. The silicate is filtered off and the final product is stabilized with 0.15% by weight of 2,6-di-tert-butyl-p-cresol (Kerobit TBK).

3: OH number=216 mg KOH/g.

4: OH number=219 mg KOH/g.

Preparation of the compounds A)

The compounds A) are prepared by reacting the above hydroxy-functional starting compounds with diisocyanates in accordance with the preparative methods PM 3, PM 4 and PM 5. The compounds obtained are named according to the starting components, eg. IPDI-1 for compound A) from IPDI and 1 and are listed in Table 2.

TABLE 2

Compounds A (monourethanes)

| No. | Compound | NCO theor. (%) | NCO measured (%) | Visc. (mPas) | Preparation |
|---|---|---|---|---|---|
| 1 | IPDI-1 | 11.9 | 11.8 | 1378 (50° C.) | PM3 |
| 2 | IPDI-2a | 11.4 | 10.7 | >10000 (50° C.) | PM3 |
| 3 | IPDI-2b | 10.6 | 10.6 | >10000 (50° C.) | PM3 |
| 4 | IPDI-2c | 10.2 | 9.8 | >10000 (50° C.) | PM3 |
| 5 | IPDI-2d | 9.6 | 8.9 | >10000 (50° C.) | PM3 |
| 6 | IPDI-5a | 12.1 | 10.7 | 1800 (50° C.) | PM3 |
| 7 | IPDI-5b | 10.8 | 10.5 | 870 (50° C.) | PM3 |
| 8 | HDI-1 | 14.0 | 13.7 | 174 (25° C.) | PM4 |
| 9 | HDI-2b | 12.3 | 11.9 | 1690 (25° C.) | PM4 |
| 10 | HDI-2d | 10.9 | 10.6 | 1370 (25° C.) | PM4 |
| 11 | HDI-3 | 9.8 | 8.6 | 500 (25° C.) | PM4 |
| 12 | HDI-4 | 9.9 | 9.3 | 250 (25° C.) | PM4 |
| 13 | HDI-5b | 12.6 | 12.8 | 302 (25° C.) | PM4 |
| 14 | IPCI-2b | 11.0 | 10.9 | 780 (50° C.) | PM3 |
| 15 | BEPDI-1 | 11.4 | 11.1 | 2420 (25° C.) | PM3 |
| 16 | BEPDI-2b | 10.2 | 9.6 | 10000 (25° C.) | PM3 |

TABLE 2-continued

| | | Compounds A (monourethanes) | | | |
|---|---|---|---|---|---|
| No. | Compound | NCO theor. (%) | NCO measured (%) | Visc. (mPas) | Preparation |
| 17 | 2,4-TDI-1 | 13.7 | 12.9 | 1200 (50° C.) | PM5 |
| 18 | 4,4'-MDI-1 | 11.0 | 10.3 | 2700 (50° C.) | PM5 |

PM 3

Monourethanes from IPDI, IPCI or BEPDI

The aliphatic diisocyanate and 200 ppm of dibutyltin dilaurate are initially charged under a blanket of nitrogen, heated to 80° C., in the case of IPCI to 50° C., and the OH component is added dropwise at this temperature over a period of 30 minutes. The mixture is subsequently allowed to react further for 60 minutes at 80° C. (IPCI 50° C.). The molar ratio of isocyanate to OH component is 1:1, by-products formed are the monomeric isocyanate (3–6%) and the diurethane. Owing to the 1:1 procedure, the yields of monourethanes are naturally lower than those of the HDI products.

PM 4

Monourethanes from HDI 1680 g of HDI (10 mol) and 0.84 g of dibutyltin dilaurate (500 ppm based on HDI) are initially charged under a blanket of nitrogen and heated to 50° C. At this temperature, 2 mol of the OH component are added dropwise over a period of 30 minutes. The mixture is allowed to react further for 30 minutes at 50° C. The product is subsequently freed of monomeric HDI by distillation in a thin-film evaporator at 165° C. (oil temperature) and 2.5 mbar. The residual monomer content of the final product is less than 0.2%. A characteristic of this "deficiency procedure" is the high yield of monourethane (>85%).

PM 5

Monourethanes from the aromatic diisocyanates TDI and MDI

The aromatic diisocyanate is initially charged under a blanket of nitrogen, heated to 80° C. and the OH component is added dropwise at this temperature over a period of 30 minutes. The mixture is subsequently allowed to react further for 60 minutes at 80° C. The molar ratio of isocyanate and OH component is 1:1, by-products formed are the monomeric isocyanate (TDI 4%, since this is more selective due to NCO groups of differing reactivity, MDI 13%) and the diurethane.

Production and testing of the clear coatings containing compounds A)

2-Component system

The compounds A) were mixed with the hydroxy-functional vinyl polymer Lumitol® H 136, BASF and the polyisocyanate Basonat® HI 100, BASF in equimolar amounts of isocyanate groups and isocyanate-reactive (blocked and not blocked) groups as shown in Table 3 and were catalyzed with dibutyltin dilaurate (DBTL, Merck) to accelerate curing.

For comparison, no compound A) was used in clear coating 1 and a bisoxazolidine was used as commercially available reactive diluent in clear coating 2. The mixtures were adjusted to an application viscosity of 20 s (DIN 53 211, cup with 4 mm outlet) using butyl acetate. The solids contents were determined in accordance with DIN V 53 216, Part 1.

Coatings having a wet film thickness of 200 μm were applied to glass plates using a hand coating frame. The clear coatings thus obtained were cured for 7 days under standard conditions of temperature and humidity. The resulting hardness of the coatings was determined by means of a pendulum damping measurement by the König method (DIN 53 157).

The coating properties obtained are summarized in Table 3.

TABLE 3

| | | | 2-Component clear coatings | | | | | | | | | | | |
|---|---|---|---|---|---|---|---|---|---|---|---|---|---|---|
| | | Comp. 1 | Comp. 2 | IPDI-1 | | | IPDI-2b | | | TDI-1 | | | HDI-2b | | |
| Clear Coating No. | | 1 | 2 | 3 | 4 | 5 | 6 | 7 | 8 | 9 | 10 | 11 | 12 | 13 | 14 |
| Lumitol ® H 136 | | 100 | 30 | 50 | 30 | 0 | 50 | 30 | 0 | 50 | 30 | 0 | 50 | 30 | 0 |
| Incozol ® LV | | | 70 | | | | | | | | | | | | |
| IPDI-1 | | | | 50 | 70 | 100 | | | | | | | | | |
| IPDI-2b | | | | | | | 50 | 70 | 100 | | | | | | |
| TDI-1 | | | | | | | | | | 50 | 70 | 100 | | | |
| HDI-2b | | | | | | | | | | | | | 50 | 70 | 100 |
| Basonat ® HI 100 | | 32.4 | 158.2 | 43.2 | 47.5 | 53.9 | 40.3 | 43.5 | 48.2 | 47.4 | 53.4 | 62.4 | 44.1 | 48.8 | 55.8 |
| DBTL[%][1] | | 0.1 | 0.2 | 0.1 | 0.2 | 0.2 | 0.1 | 0.2 | 0.2 | 0.1 | 0.1 | 0.1 | 0.2 | 0.2 | 0.2 |

| Polyisocyanate | Basonat ® HI 100 (BASF AG) | NCO content: 22% | Solids content 100% |
|---|---|---|---|
| Acrylate resin | Lumitol ® H 136 (BASF AG) | OH number: 136 | Solids content: 70% |
| Incozol ® LV | Industrial Copolymers Ltd. tetrafunctional bisoxazolidine derivative, equivalent weight = 90 (commercially available reactive diluent) | | |
| Catalyst | DBTL = Dibutyltin dilaurate (Merck) | | |

[1]based on the total weight of the polyisocyanates and reactive components

| Clear Coating No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Solids content of coating comp. % | 46 | 74 | 62 | 67 | 75 | 60 | 63 | 71 | 61 | 67 | 75 | 61 | 69 | 78 |

TABLE 3-continued

| | | | | | | | | | | | | | |
|---|---|---|---|---|---|---|---|---|---|---|---|---|---|
| Pendulum damping (oscillations) after 7 days | 139 | 34 | 148 | 150 | 153 | 146 | 142 | 152 | 159 | 159 | 162 | 94 | 64 | 24 |

| | IPCI-2b | | | IPDI-2a | | | IPDI-2c | | | IPDI-2d | | |
|---|---|---|---|---|---|---|---|---|---|---|---|---|
| Clear coating No. | 15 | 16 | 17 | 18 | 19 | 20 | 21 | 22 | 23 | 24 | 25 | 26 |
| Lumitol ® H 136 | 50 | 30 | 0 | 50 | 30 | 0 | 50 | 30 | 0 | 50 | 30 | 0 |
| IPCI-2b | 50 | 70 | 100 | | | | | | | | | |
| IPDI-2a | | | | 50 | 70 | 100 | | | | | | |
| IPDI-2c | | | | | | | 50 | 70 | 100 | | | |
| IPDI-2d | | | | | | | | | | 50 | 70 | 100 |
| Basonat ® HI 100 | 41.2 | 44.7 | 50.0 | 42.1 | 46.0 | 51.9 | 39.5 | 42.3 | 46.6 | 38.0 | 40.2 | 43.6 |
| DBTL[%] (s/s) | 0.2 | 0.2 | 0.2 | 0.2 | 0.2 | 0.2 | 0.1 | 0.1 | 0.3 | 0.1 | 0.1 | 0.1 |
| Clear coating No. | 15 | 16 | 17 | 18 | 19 | 20 | 21 | 22 | 23 | 24 | 25 | 26 |
| Solids content of coating comp. % | 62 | 68 | 76 | 60 | 63 | 71 | 60 | 65 | 73 | 57 | 63 | 72 |
| Pendulum damping (oscillations) after 7 days | 106 | 91 | 72 | 142 | 146 | 155 | 146 | 141 | 144 | 138 | 131 | 125 |

The clear coatings of the present invention have very high solids contents at a viscosity of 20 s. An equimolar reaction with polyisocyanate requires comparatively small amounts of polyisocyanate. The coatings obtained have good mechanical properties, eg. a high hardness.

1-Component system

Compounds A) from Table 2 were mixed with stoichiometric amounts of Basonat® HI 100 or Basonat® PLR 8901 and, to accelerate curing, were catalyzed prior to application with 0.1% (based on solids) of dibutyltin dilaurate (DBTL, Merck). The mixtures contained no compounds or polymers having free isocyanate-reactive groups. The reaction of the isocyanate groups occurred later exclusively with the capped isocyanate-reactive groups. The mixtures were adjusted to an application viscosity of 20 s (DIN 53 211, cup with 4 mm outlet) using butyl acetate. The solids contents of the coating compositions were determined in accordance with DIN V 53 216, Part 1, the VOC values were calculated from mass/volume ratios.

The solids contents of the coating compositions are summarized in Table 4.

TABLE 4

| | 1-component clear coatings | | | | | | |
|---|---|---|---|---|---|---|---|
| 1-component clear coating No. | 27 | 28 | 29 | 30 | 31 | 32 | 33 |
| from product No. (Table 2) | 13 | 13 | 13 | 9 | 12 | 4 | 1 |
| | HDI 5b | HDI 5b | 80 HDI 5b 20 IPDA-aldimine | HDI 2b | HDI 4 | IPDI 2c | IPDI 1 |
| Basonat ® | HI 100 | LR 8901 | LR 8901 | HI 100 | HI 100 | HI 100 | HI 100 |
| Solids content [%] | 74.8 | 78.4 | 80.3 | 75.2 | 71.7 | 72.7 | 76.4 |
| VOC [g/l] | 261 | 221 | 199 | 258 | 297 | 281 | 248 |

Basonat ® LR 8901: Low-viscosity polyisocyanate (BASF AG) NCO content = 20%
IPDA-aldimine: Vestamin ® A 139 (Hüls AG)

By appropriate selection of the system constituents, the compounds A) enable the preparation of one-component coatings which cover the entire property range (from viscoelastic coatings (coating No. 31) to brittle/hard coatings (coating No. 33)). The one-component coatings have a shelf life of a number of months and, in addition, have very high solids contents or very low proportions of solvent (VOC= volatile organic compounds).

We claim:

1. A one-component or two-component polyurethane coating composition comprising at least one reactive component capable of reacting with polyisocyanates, wherein the reactive component is a compound A) containing an isocyanate group, a urethane, thiourethane or urea group and two capped isocyanate-reactive groups, wherein the compound (A) is the addition product of 1 mol of a compound having the general structural formula

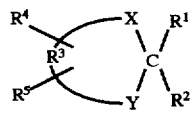

and one mol of diisocyanate, where $R^1$ and $R^2$ are, independently of one another, hydrogen or $C_1$–$C_{10}$-alkyl, X and Y are, independently of one another, oxygen, sulfur or an N-$R^6$ group, $R^3$ is $C_1$–$C_5$-alkylene and the heterocyclic ring can be substituted by further radicals $R^4$ and $R^5$, where one of the radicals $R^4$, $R^5$ or $R^6$ must bear a group capable of reacting with isocyanate and is hydroxyl, mercapto, primary or secondary amino, or be such a group capable of reacting with isocyanate and the other radical $R^4$, $R^5$ or $R^6$, if present at all, must contain no group capable of reacting with isocyanate, with the proviso that X is not oxygen when Y is N-$R^6$, and Y is not oxygen when X is N-$R^6$.

2. A one-component or two-component polyurethane coating composition as claimed in claim 1, wherein the compound of the structural formula I is a dioxolane of the formula

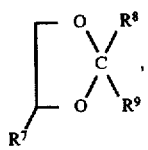

or a dioxane of the formula

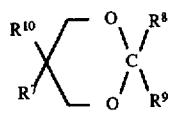

where $R^8$, $R^9$ and $R^{10}$ are, independently of one another, hydrogen or $C_1$–$C_{10}$-alkyl and $R^7$ is an aliphatic or aromatic radical comprising 1 to 30 carbon atoms which, in the case of the aliphatic radical, can contain ether groups, and must be substituted by a group capable of reacting with isocyanate, and is hydroxyl, mercapto, or primary or secondary amino.

3. A one-component or two-component polyurethane coating composition as claimed in claim 1, wherein from 1 to 100% by weight of the reactive component is made up by compounds A).

4. A substrate coated with a one-component or two-component polyurethane coating composition as claimed in claim 1.

5. An addition product of one mol of diisocyanate and one mol of the dioxolane of the structural formula II

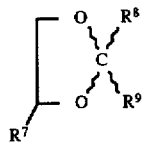

where $R^8$ and $R^9$ are, independently of one another, hydrogen or $C_1$–$C_{10}$-alkyl and $R^7$ is an aliphatic or aromatic radical comprising 1 to 30 carbon atoms which, in the case of the aliphatic radical, can contain ether groups, and must be substituted by a group capable of reacting with isocyanate which is a hydroxyl, mercapto, or primary or secondary amino group.

6. An addition product of one mol of diisocyanate and one mol of the dioxane of the formula III

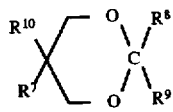

where $R^8$, $R^9$ and $R^{10}$ are, independently of one another, hydrogen or $C_1$–$C_{10}$-alkyl and $R^7$ is an aliphatic or aromatic radical comprising 1 to 30 carbon atoms which, in the case of the aliphatic radical, can contain ether groups, and must be substituted by a group capable of reacting with isocyanate which is a hydroxyl, mercapto, or primary or secondary amino group.

7. A method comprising coating a substrate with a two-component polyurethane coating composition comprising the compound A) as claimed in claim 1 as reactive diluent.

8. A method comprising coating a substrate with a one-component polyurethane coating composition comprising the compound A) as claimed in claim 1 as reactive component.

9. The one-component or two-component polyurethane coating composition as claimed in claim 2, wherein the compound is of the formula II.

10. The one-component or two-component polyurethane coating composition as claimed in claim 2, wherein the compound is of the formula III.

* * * * *

UNITED STATES PATENT AND TRADEMARK OFFICE
CERTIFICATE OF CORRECTION

PATENT NO. : 5,744,569
DATED : April 28, 1998
INVENTOR(S) : Bernd BRUCHMANN, et al.

It is certified that error appears in the above-identified patent and that said Letters Patent is hereby corrected as shown below:

On the title page item[30] Foreign Application Priority Data is missing, it should read:

--Jul. 1, 1995 [DE] GERMANY     19524046.4--

--Mar. 12, 1996 [DE] GERMANY    19609617.0--

Signed and Sealed this

Seventeenth Day of November, 1998

Attest:

BRUCE LEHMAN

Attesting Officer     Commissioner of Patents and Trademarks